Patented Feb. 22, 1949

2,462,680

UNITED STATES PATENT OFFICE 2,462,680

POLYMERS FROM ETHYLENE AND CARBON DIOXIDE

Donald E. Sargent, Easton, Pa., assignor to E. I. du Pont de Nemours & Company, Wilmington, Del., a corporation of Delaware No Drawing. Application February 5, 1946, Serial No. 645,655

6 Claims. (Cl. 260—94)

This invention deals with new polymers of ethylene, particularly with carbon dioxide-modified polymers of ethylene, and especially with the process for preparing carbon dioxide-modified polyethylenes.

The products of the instant invention are replacements for natural waxes, for example, as components of paste and liquid polishes; impregnants and coating materials for fabrics, yarns, textiles, and for other uses. The preparation of a synthetic wax having all or even many of the desirable properties of a natural wax has been difficult. Polymeric substances are, in general, too high melting or have too high melt or solution viscosities to be amenable to the processing steps in the more important outlets. Modified polymerizations have been employed for the solution of this problem but too frequently the products are soft, tacky, and unsuitable for replacing natural waxes. Modification of known substances, for example the chlorination of paraffin, has been employed with success but often such processes depend on raw materials that are already wax-like. The process of the present invention provides a particularly novel solution to the problem of making synthetic waxes in that it employs only inexpensive gaseous raw materials.

An object of the invention is to provide modified polymers of ethylene. A further object is to provide a process for the preparation of polymeric products from ethylene and carbon dioxide. Yet another object is to provide a process for the modification of ethylene polymers by conducting the polymerization under elevated temperatures and pressures in the presence of appreciable quantities of carbon dioxide. Another object is to provide carbon dioxide-modified polymers of ethylene. Other objects of the invention will hereinafter appear.

This invention comprises the preparation of carbon dioxide-modified polyethylene, by heating ethylene in the presence of carbon dioxide, a free radical-producing catalyst and preferably a peroxy catalyst at from 50–300° C., under a pressure ranging from 100 to 3000 atmospheres, or higher. The carbon dioxide-modified polyethylenes so produced are also contemplated as being within the scope of the invention.

The reactants employed in practicing this invention comprise ethylene, carbon dioxide, and, as catalyst, a free radical-producing substance as more fully particularized hereinafter. The reactants may be brought into mutual contact in a reaction zone in any order of addition and may be preheated or not, separately or mixed, before their respective additions to the reaction zone. It is generally inadvisable to permit the catalyst to be subjected to elevated temperatures more than momentarily before entering the reaction zone. The process may be operated batchwise, continuously or semi-continuously. The following detailed description illustrates one manner of carrying out the batchwise operation of the process.

A pressure-resistant reaction vessel is charged with a suitable catalyst and, if desired, a liquid reaction medium. This charging operation is preferably carried out after purging the reaction vessel of air with deoxygenated nitrogen or other inert gas. In order to prevent entrance of air, the charging is usually conducted under a blanket of inert gas. Alternatively, the reaction charge can be sucked into the closed and evacuated reaction vessel by use of a loading lock. The vessel is then closed, evacuated, charged with the desired amount of carbon dioxide and placed in a shaker machine provided with a heater and connected to a reservoir of ethylene. Controlling and recording thermocouples are placed in position, the vessel pressured with ethylene and heating and agitation are started. On reaching the selected reaction temperature, the reaction begins, usually without the induction period which is commonly observed in polymerization reaction. The course of the reaction may be followed by the pressure drop due to utilization of ethylene. The pressure may be maintained in the desired range by any of several means such as by addition of ethylene or carbon dioxide from high pressure storage, by injecting ethylene and carbon dioxide alone or mixed or by injecting an inert reaction medium. At the end point of the reaction, which is marked by cessation of pressure drop, the vessel is cooled, bled of excess gases, opened and the reaction mixture discharged. The product may be isolated by procedures illustrated in the examples, or by simple modifications thereof readily apparent to one skilled in the art.

In the following examples, reactions were carried out in a 400 cc. reaction vessel. All parts are given by weight in C. G. S. units, unless otherwise stated.

*Example 1.*—A stainless steel-lined high-pressure reaction vessel is charged with one part of benzoyl peroxide, and after closing and evacuating, 75 parts of carbon dioxide are added. The charged vessel is then placed in a shaker machine and pressured to 500 atmospheres with ethylene. Heating and agitation are started and during a reaction period of 13 hours, throughout which the temperature is maintained at 72°–88° C. and the pressure at 760–1000 atm. there is a total observed pressure drop of 390 atm. At the end of the reaction period, the vessel is allowed to cool, bled of excess gas, opened, and the contents discharged. There is thus obtained 10 parts of a wax-like substance which is hard, and which melts sharply at 110°–112° C. to a free flowing liquid. This product is found to contain 82.87% carbon and 13.11% hydrogen, which indicates that it has a mole ratio of ethylene to carbon dioxide of approximately 29 to 1. The product has a relative viscosity of 1.028 when measured on a 0.125% solution in xylene at 85° C. One part of this wax is compounded with one part of paraffin wax and two parts of turpentine. This blend is found to be an excellent paste polish. The film, after rubbing to a high gloss, is extremely hard and mar resistant.

*Example 2.*—Example 1 is duplicated, except for the reduction of the carbon dioxide charged to 25 parts. The product obtained amounts to 20.5 parts. This is a fluffy, white powder melting at 115°–116° C. to a viscous fluid. This wax is found to contain 84.04% carbon and 14.17% hydrogen and to have a saponification number of 14.1. The relative viscosity of a 0.125% solution in xylene at 85° C. is 1.069. Correlation of these analyses indicate that this product has an ethylene/carbon dioxide mole ratio of approximately 66 to 1.

*Example 3.*—Stainless steel-lined high-pressure vessel is charged with 100 parts of benzene and 0.3 part by volume of di-(tertiary butyl) peroxide. The vessel is closed and additionally charged with 73 parts carbon dioxide and 93 parts of ethylene. During a reaction time of 8 hours, throughout which the temperature is maintained at 134°–140° C. and the presure at 600–950 atm., there is a total observed pressure drop of 1710 atm. The pressure is maintained by the periodic injection of water. At the end of the reaction the vessel is cooled, bled of excess gas, and the contents discharged. The benzene is separated by steam distillation and the residue filtered to separate water. The waxy product is then dried. There is thus obtained 57 parts of a hard wax which melts at 102° C., contains 85.48% carbon, 14.24% hydrogen, has a tensile strength of 1245 lbs./sq. in., an elongation of 350% and a bending modulus of 12,000 lbs./sq. in.

*Example 4.*—A silver-lined high-pressure reaction vessel is charged with 0.3 part by volume of di-(tertiary butyl) peroxide. The vessel is then closed, charged with 105 parts of carbon dioxide and placed in a shaker machine, connected with a high-pressure ethylene reservoir and pressured to 300 atmospheres with ethylene. Heating and agitation are then started and during a reaction time of 15 hours, throughout which the temperature is maintained at 137°–140° C. and the pressure at 780–1000 atm., there is a total observed pressure drop of 145 atm. In this experiment the presure is maintained by the periodic addition of ethylene. There is thus obtained 31 parts of a wax-like product which melts at 103°–105° C. and can be molded into thin films. These films can be bent double without fracture, have a tensile strength of 565 lbs./sq. in., an elongation of 19%, and bending modulus of 6000 lbs./sq. in. The product is compatible with wax solvents from which it can be laid down in thin films that acquire a high gloss on polishing.

Ethylene used in the practice of this invention may contain small amounts of ethane, propane, nitrogen, hydrogen, carbon dioxide or oxygen. Oxygen in concentrations above 1000 parts per million (p. p. m.) generally operates to the detriment of the reaction; consequently, ethylene purified to contain less than 100 p. p. m., generally less than 50 p. p. m. and preferably less than 10 p. p. m. of oxygen is employed. Ethylene may be conveniently purified by scrubbing or by distillation.

Carbon dioxide used in the practice of this invention should be pure. The best commercial grades have been found satisfactory.

The ration of ethylene to carbon dioxide in the reaction mixture may vary from 0.5 to 5 on a weight basis, which may also be designated by a weight ratio of ethylene to carbon dioxide between 0.5:1 to 5:1. The lower ratios within this range are to be preferred since this makes for a greater extent of modification.

The greatest modification of ethylene polymerization by carbon dioxide is realized in "bulk" systems, i. e. in systems containing nothing but the ethylene, carbon dioxide and catalyst. However, modified ethylene polymerizations may be accomplished in the presence of a reaction medium, preferably an inert organic liquid such as benzene, chlorobenzene, isooctane, 2, 2, 3-trimethylbutane and similar hydrocarbons free of secondary and tertiary hydrogens or having such hydrogens in a highly hindered position. Water can be used as a reaction medium but the modification effected is relatively slight. Emulsion and granular systems may also be employed though the efficiency of carbon dioxide as a modifier is diminished.

While the process has been described for the modification of ethylene polymers by effecting the polymerization of ethylene in the presence of carbon dioxide, interpolymers and telomers of ethylene can be similarly modified. There are a large number of known interpolymers and telomers of ethylene which are prepared by the interpolymerization or telomerization of ethylene with respectively other polymerizable compounds and telogens and in accord with this invention these products can be also modified by effecting the interpolymerization or telomerization in the presence of carbon dioxide, the reaction being effected in accord with the process as disclosed.

As catalysts for inducing the reaction of this invention there may be used any compounds which will generate free-radicals under the reaction conditions and which catalyze the polymerization of ethylene, although the peroxy compounds are preferred. Specific classes of compounds which catalyze the polymerization of ethylene include peroxides, such as diacetyl peroxide, acetyl benzoyl peroxide, dipropionyl peroxide, dilauroyl peroxide, benzoyl peroxide, dimethyl peroxide, diethyl peroxide, dipropyl peroxide, tetralin peroxide cyclohexane peroxide, acetone peroxide: hydrazine derivatives, such as, hydrazine hydrochloride, hydrazine sulfate, dibenzoylhydrazine, diacetylhydrazine, trimethylhydrazinium iodide: amine oxides, such as, pyridine oxide, trimethylamine oxide, dimethylaniline oxide: alkali metal and ammonium persulfates, perborates, and percarbonates: compounds containing the group >C=N— and derived from ketaldones, i. e., a ketone or aldehyde, such as the azines (containing the group >C=N—N=C<) e.g., benzalazine, heptaldazine and diphenylketazine; oximes (containing the group >C=NOH) such as d-camphor oxime, acetone oxime, alpha-benzil dioxime, butyraldoxime, alpha-benzoin oxime, dimethylglyoxime: hydrazones (containing the group >C=N—N<) such as benzaldehyde phenylhydrazone, phenylhydrazones of cyclohexanone, cyclopentanone, acetophenone, menthone, camphor, and benzophenone; semicarbazones (containing the group

>C=N—NHCONH₂)

such as semicarbazones of acetone, methyl ethyl ketone, diethyl ketone, biacetyl, cyclopentanone, cyclohexanone, acetophenone, propiophenone, camphor, and benzophenone; Schiff's bases (containing the group >C=N—) such as benzalaniline, benzal-p-toluidine, benzal-o-toluidine, benzaldehyde derivatives of methylamine, ethylamine, and heptylamine; anils and analogous compounds of other amines, such as acetaldehyde anil, isobutyraldehyde anil, heptaldehyde anil, etc.: organo metallic compounds such as tetraethyllead oxygen.

These catalysts are generally used in amounts from about 0.001% to 0.5% by weight based on the total reactants. While it is generally not necessary, for attaining extremely high rates of reaction or for other special purposes, even higher amounts of catalysts may be used; for example, amounts ranging up to as high as 1% or even 5% as an upper limit can be employed. For their best utility in the practice of this invention, the foregoing catalysts should be highly purified. For example, some of the phenylhydrazones and some of the Schiff's bases are relatively unstable and decompose on exposure to moisture of air. When the catalysts show such sensitivity they should be freshly prepared immediately before use. Some, such as benzalaniline, can be satisfactorily stored in a vacuum or under a nitrogen atmosphere.

The temperatures and pressures employed in the practice of this invention are interdependent variables and each is determined with relation to the other. Temperatures in the range of 50–300° C. and pressures in the range of 100–1500 atms. are generally employed. The use of the higher temperatures generally makes possible the use of lower reaction pressures and conversely lower reaction temperatures make necessary an increase in the reaction pressure. Somewhat higher pressures, for example, up to 3000 atms. or more, may be employed and are particularly desirable for high rates of reaction. When operating in a continuous manner, the time of contact influences the reaction temperature and the operable range given above may be extended to about 400° C. particularly for short contact times. In general, increase in reaction temperature makes for a decrease in the average molecular weight of the product while an increase in pressure increases the average molecular weight.

The equipment used in the practice of this invention should be strong enough to withstand the temperatures and pressures encountered. Those portions of the apparatus which come in contact with the reactants are preferably non-catalytic and should be of a type to induce no side reactions. Such materials may be stainless steels, silver, tin, lead, enamel, and glass.

It is preferable to agitate the reactants and by this is meant any means for intimately mixing the reactants such as by stirring, atomization, bubbling the gas phase through the liquid phase of the reaction, by turbulent flow in a tubular reactor, and the like.

Although batch operations have generally been described, the process of this invention can be easily carried out in a continuous manner in either tubular or autoclave reactors. Continuous operation offers numerous advantages in control of temperature, high space-time yield and increased flexibility in the reactant concentrations that may be employed. Suitable modifications of reaction variables have been shown for a successful operation of a continuous process.

The products of this invention may be employed in a wide variety of uses; for example, as components of paste and liquid polishes suitable for floor, shoe, furniture, and automobile polishes; carbon paper ink; in the processing of natural and synthetic rubber; as a mold lubricant; for coating and impregnating paper, cardboard, fiber board, fabrics, yarns, and textiles; as a hardening agent for lubricants or candles; as a lubricant for drawing, spinning, and other plastic working of metals, as a lubricant for vulcanizing molds, and for molds for compression and injection molding of plastics. These products can also be used, alone or in compositions for coating metal to protect against corrosion on storage or transit under adverse conditions.

I claim:

1. A process for the preparation of carbon dioxide-modified polymers of ethylene which comprises heating ethylene and carbon dioxide, in a weight ratio of ethylene to carbon dioxide between 0.5:1 to 5:1, at a temperature between 50 and 300° C. and a pressure above 100 atmospheres in the presence of a free radical-producing catalyst.

2. A process for the preparation of carbon dioxide-modified polymers of ethylene which comprises heating ethylene and carbon dioxide, in a weight ratio of ethylene to carbon dioxide between 0.5:1 to 5:1, at a temperature between 50 and 300° C. and a pressure above 100 atmospheres in the presence of a peroxy compound catalyst.

3. A process for the preparation of carbon dioxide-modified polymers of ethylene which comprises heating ethylene and carbon dioxide present in a weight ratio of ethylene to carbon dioxide between 0.5:1 to 5:1 at a temperature between 50 and 150° C. and a pressure between 100 and 1500 atmospheres in the presence of a peroxy compound catalyst.

4. A modified polymer of ethylene containing a mole ratio of ethylene to carbon dioxide of from about 29 to 1 to about 66 to 1.

5. A carbon dioxide-modified polymer of ethylene having a mole ratio of ethylene to carbon dioxide of approximately 29 to 1.

6. A wax-like carbon dioxide-modified ethylene polymer containing on a mol. ratio basis from 29:1 to 66:1 ethylene to carbon dioxide.

DONALD E. SARGENT.

REFERENCES CITED

The following references are of record in the file of this patent:

UNITED STATES PATENTS

| Number | Name | Date |
|---|---|---|
| 2,055,233 | Woodhouse | Sept. 1, 1936 |
| 2,200,429 | Perrin et al. | May 14, 1940 |

OTHER REFERENCES

Beeck et al., "On the Polymerization of Ethylene and Propylene by Free Alkyl Radicals"; J. Chem. Physics 9, 480–3 (1941).

Certificate of Correction

Patent No. 2,462,680.　　　　　　　　　　　　　　　　　　February 22, 1949.

DONALD E. SARGENT

It is hereby certified that errors appear in the printed specification of the above numbered patent requiring correction as follows:

Column 2, line 32, for "ethyiene" read *ethylene*; column 4, line 14, for the word "ration" read *ratio*; line 62, same column, for "cyclohexane" read *cyclohexanone*; and that the said Letters Patent should be read with these corrections therein that the same may conform to the record of the case in the Patent Office.

Signed and sealed this 28th day of June, A. D. 1949.

[SEAL]

THOMAS F. MURPHY,
　　　　　　　　　　　　　　　　　　　　　　　*Assistant Commissioner of Patents.*